United States Patent [19]
Caiozza

[11] Patent Number: 5,273,648
[45] Date of Patent: Dec. 28, 1993

[54] FILTER CARTRIDGE MAGNETIC BELT

[76] Inventor: Joseph C. Caiozza, 321 W. Market St., Long Beach, N.Y. 11561

[21] Appl. No.: 913,219

[22] Filed: Jul. 15, 1992

[51] Int. Cl.5 .............................................. B01D 35/06
[52] U.S. Cl. .................... 210/222; 210/223; 335/306
[58] Field of Search ............... 210/222, 223; 184/6.25; 335/306, 302, 303, 304

[56] References Cited

U.S. PATENT DOCUMENTS

| | | | |
|---|---|---|---|
| 3,460,679 | 8/1969 | Llewellyn | 210/222 |
| 4,265,755 | 5/1981 | Zimmerman | 210/222 |
| 4,894,153 | 1/1990 | Shirdavani | 210/222 |

FOREIGN PATENT DOCUMENTS 11365  3/1980  Japan ..................... 210/222

*Primary Examiner*—Matthew O. Savage
*Attorney, Agent, or Firm*—Leon Gilden

[57] ABSTRACT

A filter cartridge includes a plurality of permanent magnet block members mounted in surrounding relationship relative to the filter cartridge, with each block including a concave front wall in confrontation to the filter cartridge side wall, and each block member including a rear wall having at least one rear wall strap receiving a flexible belt, wherein the flexible belt is directed through each of the rear wall straps to secure the magnetic block members together.

3 Claims, 4 Drawing Sheets

FILTER CARTRIDGE MAGNETIC BELT

BACKGROUND OF THE INVENTION

1. Field of the Invention

The field of invention relates to cartridges, and more particularly pertains to a new and improved filter cartridge magnetic belt arranged for ease of attachment and removable relative to a filter cartridge for maintaining positioning of ferrous metallic particles within the filter cartridge.

2. Description of the Prior Art

Prior art magnetic belt structure has been utilized in the prior art and exemplified in U.S. Pat. No. 3,460,679 to Llewellyn wherein the belt member is formed of a discontinuous belt type structure to arrange for biased engagement relative to an exterior surface of a filter cartridge. The instant invention attempts to overcome deficiencies of the Llewellyn patent by providing for an organization to more readily accommodate filter cartridges of various diameters, wherein the belt structure of the above noted patent utilizes a spring steel belt biased towards a predetermined circumferential configuration.

Further examples of magnetic filter cartridge apparatus to position magnetic members relative to a filter cartridge are set forth in the U.S. Pat. Nos. 4,826,592; 4,450,075; and 4,851,116.

As such, it may be appreciated there continues to be a need for a new and improved filter cartridge magnetic belt as set forth by the instant invention which addresses the problems of ease of use as well as effectiveness in construction and in this respect, the present invention substantially fulfills this need.

SUMMARY OF THE INVENTION

In view of the foregoing disadvantages inherent in the known types of magnetic belt apparatus now present in the prior art, the present invention provides a filter cartridge magnetic belt wherein the same is arranged for accommodating various circumferential configurations of cartridge members utilizing a single securement belt component. As such, the general purpose of the present invention, which will be described subsequently in greater detail, is to provide a new and improved filter cartridge magnetic belt which has all the advantages of the prior art magnetic belt apparatus and none of the disadvantages.

To attain this, the present invention provides a filter cartridge including a plurality of permanent magnet block members mounted in surrounding relationship relative to the filter cartridge, with each block including a concave front wall in confrontation to the filter cartridge side wall, and each block member including a rear wall having at least one rear wall strap receiving a flexible belt, wherein the flexible belt is directed through each of the rear wall straps to secure the magnetic block members together.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved filter cartridge magnetic belt which has all the advantages of the prior art magnetic belt apparatus and none of the disadvantages.

It is another object of the present invention to provide a new and improved filter cartridge magnetic belt which may be easily and efficiently manufactured and marketed.

It is a further object of the present invention to provide a new and improved filter cartridge magnetic belt which is of a durable and reliable construction.

An even further object of the present invention is to provide a new and improved filter cartridge magnetic belt which is susceptible of a low cost of manufacture with regard to both materials and labor, and which accordingly is then susceptible of low prices of sale to the consuming public, thereby making such filter cartridge magnetic belts economically available to the buying public.

Still yet another object of the present invention is to provide a new and improved filter cartridge magnetic belt which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
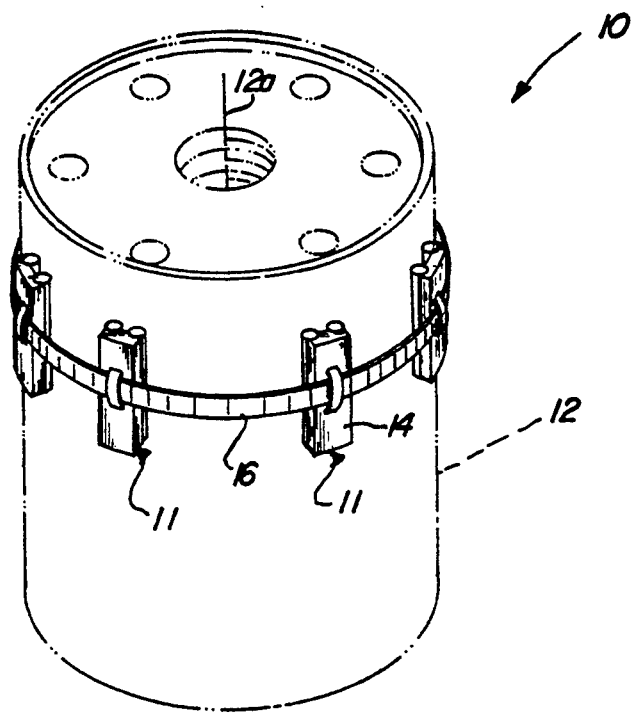
FIG. 1 is an isometric illustration of the instant invention.
Figure 2:
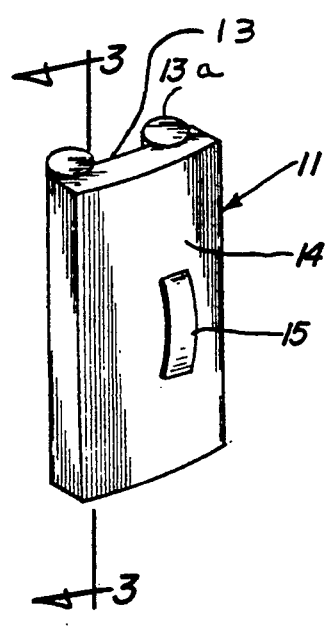
FIG. 2 is an isometric illustration of an individual magnetic block member of the invention.
Figure 3:
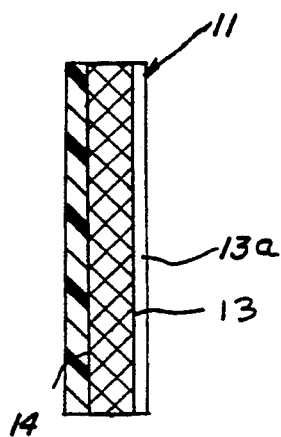
FIG. 3 is an orthographic view, taken along the lines 3—3 of FIG. 2 in the direction indicated by the arrows.
Figure 4:
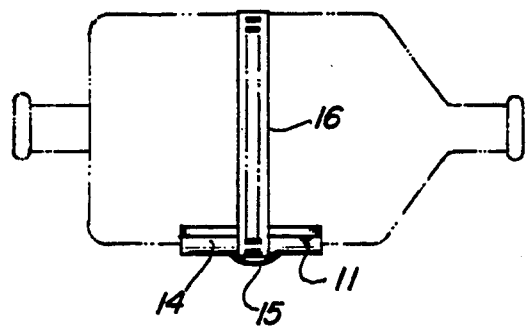
FIG. 4 is an orthographic view of the invention mounted to a further example of a filter cartridge.
Figure 5:
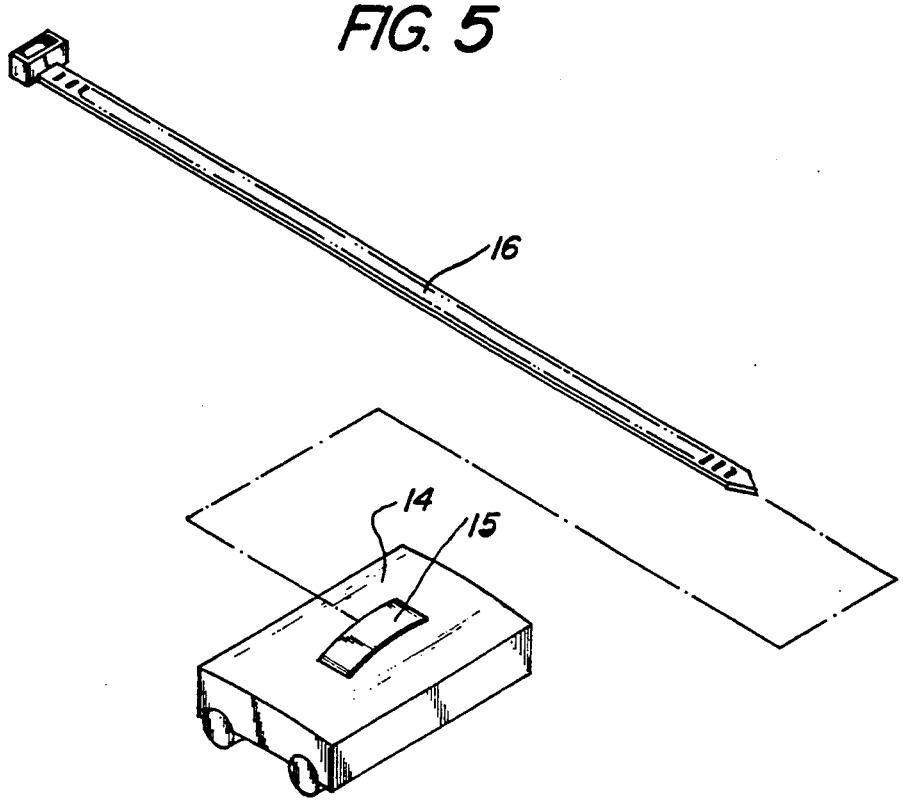
FIG. 5 is an isometric exploded illustration of the belt structure arranged for securement relative to an associated block member.

With reference now to the drawings, and in particular to FIGS. 1 to 9 thereof, a new and improved filter cartridge magnetic belt embodying the principles and concepts of the present invention and generally designated by the reference numeral 10 will be described.

More specifically, the filter cartridge magnetic belt 10 of the instant invention essentially comprises a plurality of magnetic block members 11 arranged in circumferential surrounding relationship relative to and in confrontation to a filter canister cylindrical wall 12 and associated filter canister, as illustrated in FIG. 1. Each block member 11 is formed with a block arcuate concave front wall 13 arranged for confrontation with the filter canister cylindrical wall 12, with a block rear wall 14 having a rear wall strap 15 mounted thereon. The front wall includes spaced parallel cylindrical magnets 13a for accommodation of the arcuate exterior surface of the canister cylindrical wall 12. The canister cylindrical wall 12 is defined about a filter axis 12a, wherein the straps 15 are oriented in a parallel relationship relative to the axis to receive an associated flexible belt 16 therethrough. The flexible belt 16 is directed through each strap of each magnetic block member 11. It should be noted that the magnetic block members 11 are formed of a permanent ferromagnetic material for continued and repeated use. The flexible belt 16 is formed with a first end having a belt fastener head to receive a second end of the belt in an engaging relationship.

Figure 6:
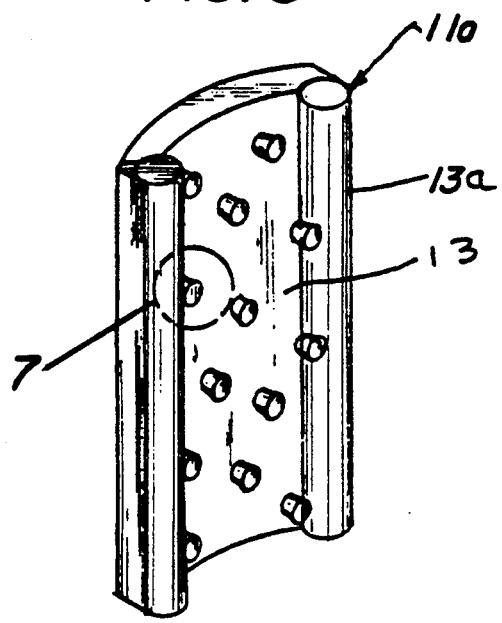
FIG. 6 is an isometric illustration of a modified block member.
Figure 7:
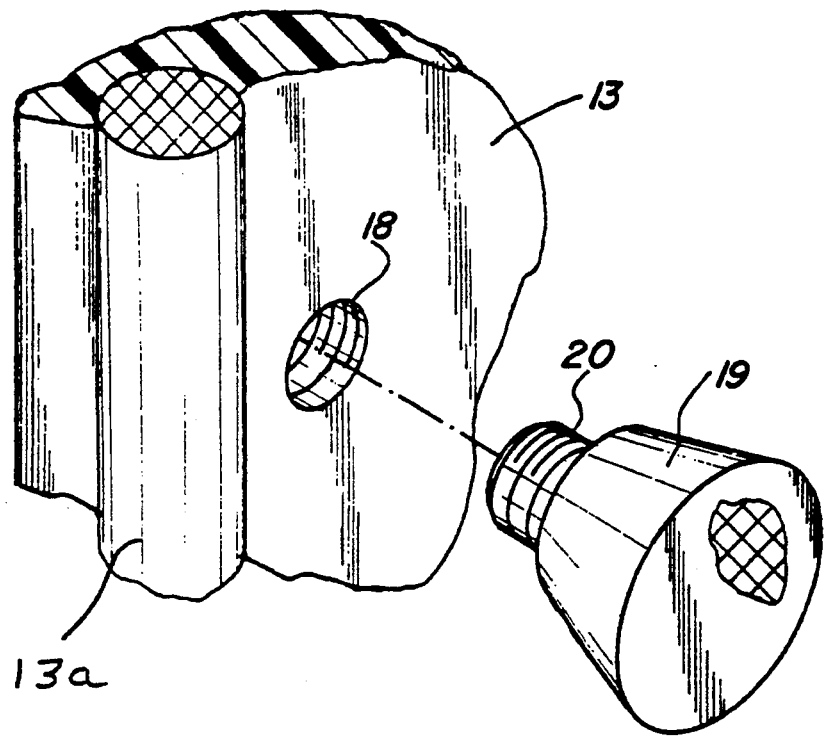
FIG. 7 is an enlarged isometric illustration of section 7 in an exploded view, as set forth in FIG. 6.

The FIGS. 6 and 7 illustrate the use of a modified block member 11a in lieu of the members 11, as illustrated in FIG. 1. Each block member 11a includes the front wall 13 formed with a matrix of internally threaded bores 18. Each bore 18 receives a magnetic plug head 19 having an externally threaded shank 20 threadedly received within the bore 18. In this manner, each plug head 19 projects beyond the front wall 13, wherein optional use of this organization is available, wherein the front wall 13 is in a spaced relationship to function as a heat sink relative to the canister 12 to draw heat therefrom while simultaneously maintaining magnetic force to the canister by way of the plug heads 19.

Figure 8:
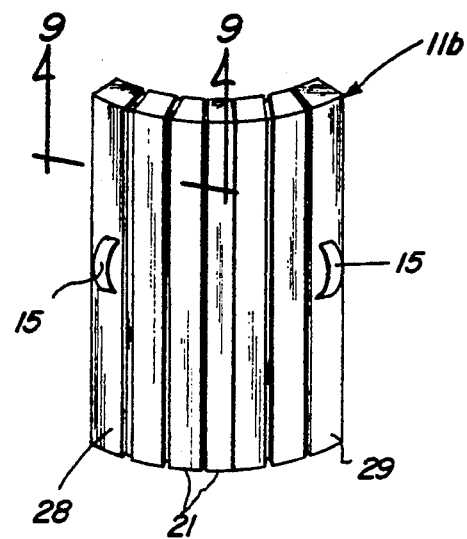
FIG. 8 is an isometric illustration of a yet further modified magnetic block member of the invention.
Figure 9:
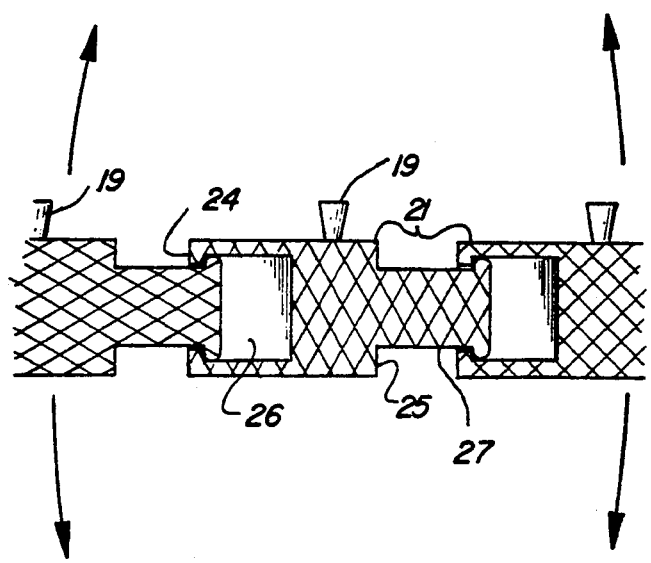
FIG. 9 is an enlarged orthographic view, taken along the lines 9—9 of FIG. 8 in the direction indicated by the arrows.

The FIGS. 8 and 9 illustrate a further modified block member 11b that may be utilized in lieu of the block members 11, as illustrated in FIG. 1, that in addition to the structure as set forth in the FIGS. 6 and 7 includes the block member 11b formed of a plurality of parallel magnetic slats having parallel magnetic intermediate slats 21 articulated relative to one another, with a first outer slat 28 and a second outer slat 29 at opposed sides of each block member 11b. The slats each include a plurality of internally threaded bores and spike heads, as illustrated in FIG. 7 and indicated in FIG. 9, wherein the the first and second outer slats include first and second sides 24 and 25. The intermediate slats, as exemplified in FIG. 9, includes a first side slot 26 parallel relative to the slat to receive a second side projecting lug 27 pivotally within the slot to permit articulation of each of the slats 21, 28, and 29 relative to one another. The first outer slat 28 is formed to include the projecting log 27 along for reception within an adjacent first side slot 26 of an adjacent intermediate slat 21. The second outer slat 29 includes a first side slot 26 directed through its first side 24 for reception of a second side projecting lug 27 of an intermediate and adjacent slat 21. The first and second outer slats 28 and 29 are each arranged with a strap 15, wherein the straps 15 are aligned relative to one another to receive the flexible belt 16 therethrough. In this manner, the articulated slat structure of each of the magnetic blocks are arranged to accommodate a wide variety of filter cartridges of various circumferential configurations and sizes.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A filter cartridge belt for securement about a filter cartridge, wherein the magnetic belt comprises, a plurality of magnetic block members adapted for communication with the cartridge, each of the block members includes a concave front wall and a rear wall, said front wall being spaced from said rear wall, and each said rear wall includes at least one rear wall strap, and a flexible belt, the flexible belt includes a first end and a second end, the flexible belt is directed through each said strap, and the belt first end is directed through the belt second end for securement about the cartridge, and the front wall includes a plurality of internally threaded bores, and each of the bores includes a magnetic plug head formed of magnetic material and having an externally threaded shank received within the internally threaded bore, and each magnetic plug head projects beyond the front wall.

2. A magnetic belt as set forth in claim 1, wherein each said block member includes a plurality of parallel slats, said slats being comprised of at least one intermediate slat and a first outer slat and a second outer slat, the intermediate slat includes an intermediate slat first side and an intermediate slat second side, the first outer slat includes a first outer slat first side and a first outer slat second side, the second outer slat includes a second outer slat first side and a second outer slat second side, and first means for articulately mounting the first outer slat second side to the intermediate slat first side, and second means for articulately mounting the intermediate second slat second side to the second outer slat first side, wherein one of said straps is mounted on said first outer slat and another of said straps is mounted on said second outer slat, wherein said straps are arranged in aligned relationship relative to one another to receive the belt therethrough.

3. A magnetic belt as set forth in claim 2 wherein the first outer slat second side includes an elongate projecting lug and the intermediate slat first side includes an intermediate slat first side slot to receive the first outer slat projecting lug therewithin in a pivotal relationship to form said first means, and the intermediate slat second side includes an intermediate slat second side lug and the second outer slat first side includes a second outer slat first side slot pivotally receiving the intermediate slat second side lug pivotally therewithin to form said second means.

* * * * *